United States Patent
Kojima et al.

(10) Patent No.: US 9,027,973 B2
(45) Date of Patent: May 12, 2015

(54) BUMPER FASTENING CLIP

(71) Applicants: Nifco Inc., Yokahama-shi, Kanagawa (JP); Nissan Motor Co., Ltd., Yokohama, Kanagawa (JP)

(72) Inventors: Shunpei Kojima, Sagamihara (JP); Anikesh Barmase, Tokyo (JP); Yohei Nagahori, Sagamihara (JP)

(73) Assignees: Nifco Inc., Yokohama-shi, Kanagawa-ken (JP); Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/380,274

(22) PCT Filed: Feb. 21, 2013

(86) PCT No.: PCT/JP2013/054395
§ 371 (c)(1),
(2) Date: Aug. 21, 2014

(87) PCT Pub. No.: WO2013/125651
PCT Pub. Date: Aug. 29, 2013

(65) Prior Publication Data
US 2015/0028607 A1    Jan. 29, 2015

(30) Foreign Application Priority Data
Feb. 22, 2012    (JP) .................................. 2012-035838

(51) Int. Cl.
*B60R 19/04*    (2006.01)
*B60R 19/24*    (2006.01)
(Continued)

(52) U.S. Cl.
CPC . *B60R 19/24* (2013.01); *F16B 5/07* (2013.01); *F16B 5/12* (2013.01)

(58) Field of Classification Search
USPC .............. 296/193.09; 293/102, 120, 154, 155
See application file for complete search history.

(56) References Cited

U.S. PATENT DOCUMENTS 1,937,197 A * 11/1933 Halladay ........................ 293/102
4,095,831 A *  6/1978 Hagiwara et al. ............. 293/126
(Continued)

FOREIGN PATENT DOCUMENTS

JP    H01-072443 U    5/1989
JP    H10-324204 A    12/1998
(Continued)

OTHER PUBLICATIONS

PCT, "International Search Report for PCT/JP2013/054395".

*Primary Examiner* — Lori L Lyjak
(74) *Attorney, Agent, or Firm* — Manabu Kanesaka

(57) ABSTRACT

A bumper fixing clip includes a leg portion engaging with a vehicle body panel; engagement claws engaging with a plurality of engagement holes formed on a bumper side; and an engagement member including a second engagement claw engageable with or retractable from one of the engagement holes formed on the bumper side by operating an operation portion, and fixing the bumper to the vehicle body panel. The engagement member is integrally formed with a fixing clip main body, and includes an approximately rod-like operation portion; the second engagement claw formed in a vicinity of a turning center of the operation portion; and an abutment piece formed on a side opposite to the second engagement claw. Also, the fixing clip main body includes a control portion abutting against the abutment piece of the operation portion, and controlling a moving range of the operation portion so as to reduce a force operating the operation portion, and even if an excessive force is applied, the moving range is controlled so as to prevent a breakage.

5 Claims, 8 Drawing Sheets

(51) Int. Cl.
*F16B 5/07* (2006.01)
*F16B 5/12* (2006.01)

(56) References Cited

U.S. PATENT DOCUMENTS 4,364,591 A * 12/1982 Bien .............................. 293/102
4,579,755 A * 4/1986 Takeda et al. ................... 428/31
5,092,643 A * 3/1992 Okamoto et al. ............. 293/155
6,425,624 B1 * 7/2002 Kurek et al. .................. 296/155
8,616,596 B2 * 12/2013 Likar et al. ................... 293/155

FOREIGN PATENT DOCUMENTS

| JP | H11-034768 A | 2/1999 |
| JP | 2003-191807 A | 7/2003 |
| JP | 4810521 B2 | 11/2011 |

* cited by examiner

BUMPER FASTENING CLIP

RELATED APPLICATIONS

The present application is National Phase of International Application No. PCT/JP2013/054395 filed Feb. 21, 2013, and claims priority from Japanese Application No. 2012-035838, filed Feb. 22, 2012.

FIELD OF TECHNOLOGY

The present invention relates to a bumper fixing clip used for fixing a bumper to a vehicle body panel, and especially, the bumper fixing clip which excels in fixation stability and can improve operability in attaching/detaching operations of the bumper.

BACKGROUND ART

Conventionally, the bumper fixing clip easily and reliably attaches the bumper to the vehicle body panel, and in consideration of a repair and the like, the bumper fixing clip is formed to be releasable.

For example, the bumper fixing clip is formed in such a way as to include a leg portion engaging with an attachment hole drilled in the vehicle body panel; and an engagement claw engaging with an engagement hole formed in a flange portion extending on a vehicle body panel side more than an upper edge portion of the bumper, and the bumper fixing clip is disposed in both side portions in a vehicle width direction of the bumper.

For example, in a case of the bumper fixing clip with a structure as shown in Patent Document 1, the bumper fixing clip is provided displaceably only in a direction different from a mounting removal direction relative to the vehicle body panel of the bumper alongside of the engagement claw, and by a displacement thereof, there is provided an engagement member engaging with the engagement hole disengageably, and by pushing down a manual knob of the engagement member, an engagement with the bumper can be released.

PRIOR ART DOCUMENT

Patent Document

Patent Document 1: Japanese Patent No. 4810521

SUMMARY OF THE INVENTION

Problems to be Solved by the Invention

In the bumper fixing clip with the aforementioned structure, however, it is disadvantageous in that a great operating force has to be applied to an operation portion (the manual knob) for releasing the bumper. Also, there is a concern about a breakage in a case wherein the manual knob is excessively displaced as well.

The present invention is made in order to solve the aforementioned problems, and provides a bumper fixing clip which can reduce a force operating the operation portion, and can prevent a breakage by controlling a moving range even if an excessive force is applied.

Means for Solving the Problems

The present invention provides a bumper fixing clip comprising a leg portion engaging with a vehicle body panel; engagement claws engaging with a plurality of engagement holes formed on a bumper side; and an engagement member including a second engagement claw engageable with or retractable from one of the engagement holes formed on the bumper side by operating an operation portion, and fixing the bumper to the vehicle body panel. The engagement member is integrally formed with a fixing clip main body, and includes an approximately rod-like operation portion whose one end is supported; the second engagement claw formed in a vicinity of a support end of the operation portion; and an abutment piece formed on a side opposite to the second engagement claw. Also, the fixing clip main body includes a control portion abutting against the abutment piece of the operation portion, and controlling a moving range of the operation portion.

In the bumper fixing clip according to the present invention, preferably, the control portion is provided at a position of abutting against the abutment piece when the second engagement claw is disengaged from the engagement hole of the bumper by carrying out a turning operation of the operation portion around the support end. According to the aforementioned preferred aspect, the control portion can prevent a breakage caused by excessive turning of the operation portion.

In the bumper fixing clip according to the present invention, preferably, the engagement member includes the second engagement claw formed on a face facing the engagement hole of the bumper; and the abutment piece formed to project on a side opposite to the second engagement claw. Also, preferably, when an external force is applied to the bumper, a movement of the second engagement claw abutting against a peripheral edge of the engagement hole of the bumper is restricted by a contact between the abutment piece and the control portion. According to the aforementioned preferred aspect, in a case wherein an external force is applied to the bumper in a removal direction, an engagement state between the second engagement claw and the engagement hole can be retained.

In the bumper fixing clip according to the present invention, preferably, a wall portion is provided adjacent to the engagement member of the fixing clip main body, and when the external force is applied to the bumper to be fixed, the wall portion controls the operation portion from deforming in a longitudinal direction of the fixing clip main body, or controls the operation portion from deforming in a bumper removal direction. According to the aforementioned preferred aspect, in the case wherein the external force is applied to the bumper in the removal direction, the operation portion and the wall portion contact with each other so as to prevent the engagement member from moving into a disengagement direction.

In the bumper fixing clip according to the present invention, preferably, the second engagement claw formed in the engagement member is a projection formed by a first inclined face formed on a face facing the bumper to be inserted; and a second inclined face having an inclination angle larger than that of the first inclined face, and facing a direction opposite to the first inclined face. According to the aforementioned preferred aspect, in a case wherein the bumper is attached to the fixing clip main body, after the second engagement claw directly moves backward along the first inclined face, the second engagement claw engages with the engagement hole by returning with an elastic force, and in a case wherein the bumper is released from the fixing clip main body, the operation portion is operated to move the second engagement claw backward so as to allow the second engagement claw to be released from the engagement hole. Also, the inclination angle of the second inclined face is larger than that of the first inclined face, so that the bumper can be easily mounted; however, the bumper is difficult to come out.

Effect of the Invention

According to the bumper fixing clip of the present invention, the force applied to the operation portion when the bumper is released can be reduced, and the breakage can be prevented by controlling the moving range even if the excessive force is applied to the operation portion.

BEST MODES OF CARRYING OUT THE INVENTION

Figure 1:
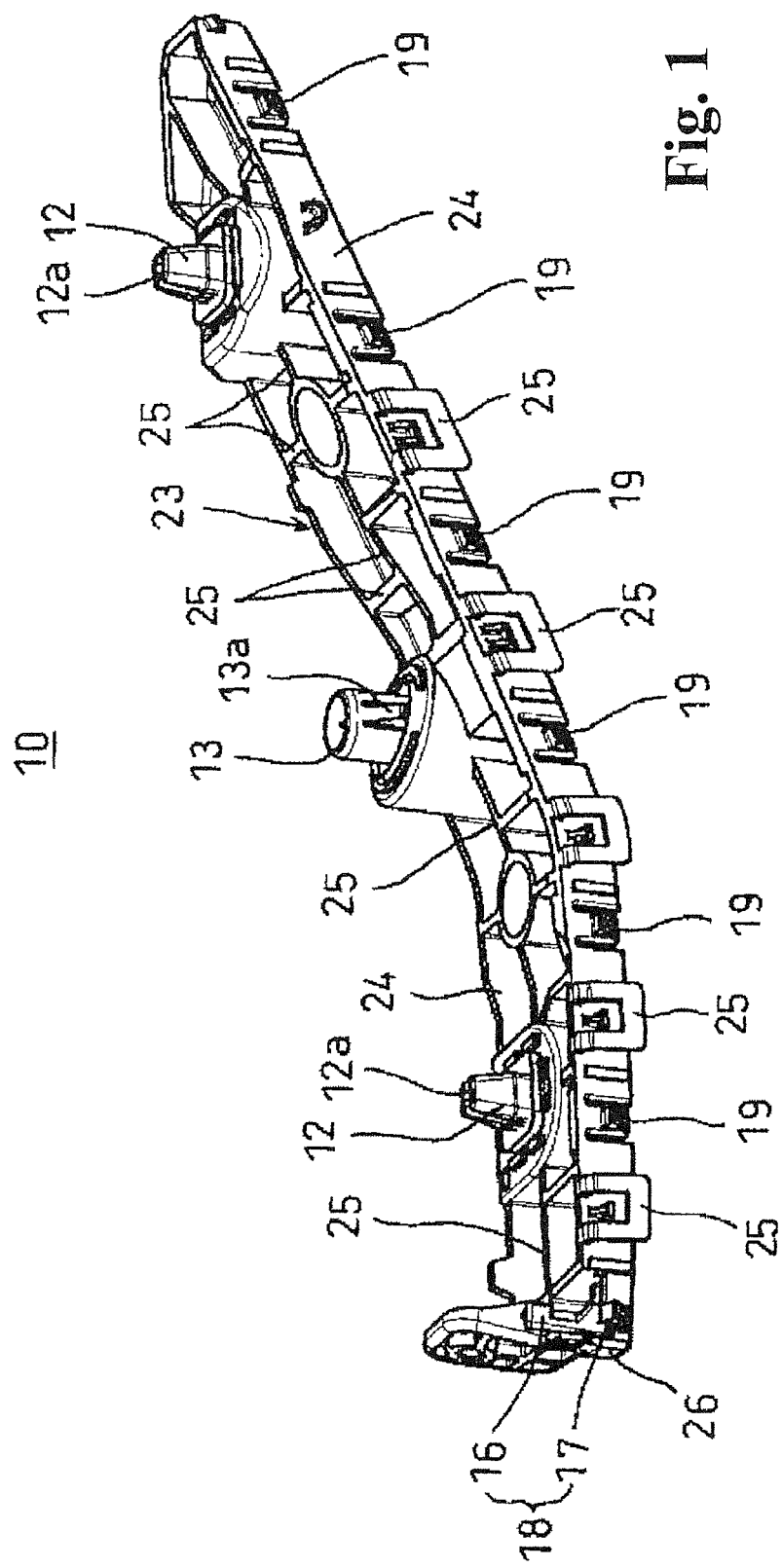
FIG. 1 is a perspective view of a bumper fixing clip which is one embodiment of the present invention.
Figure 2:
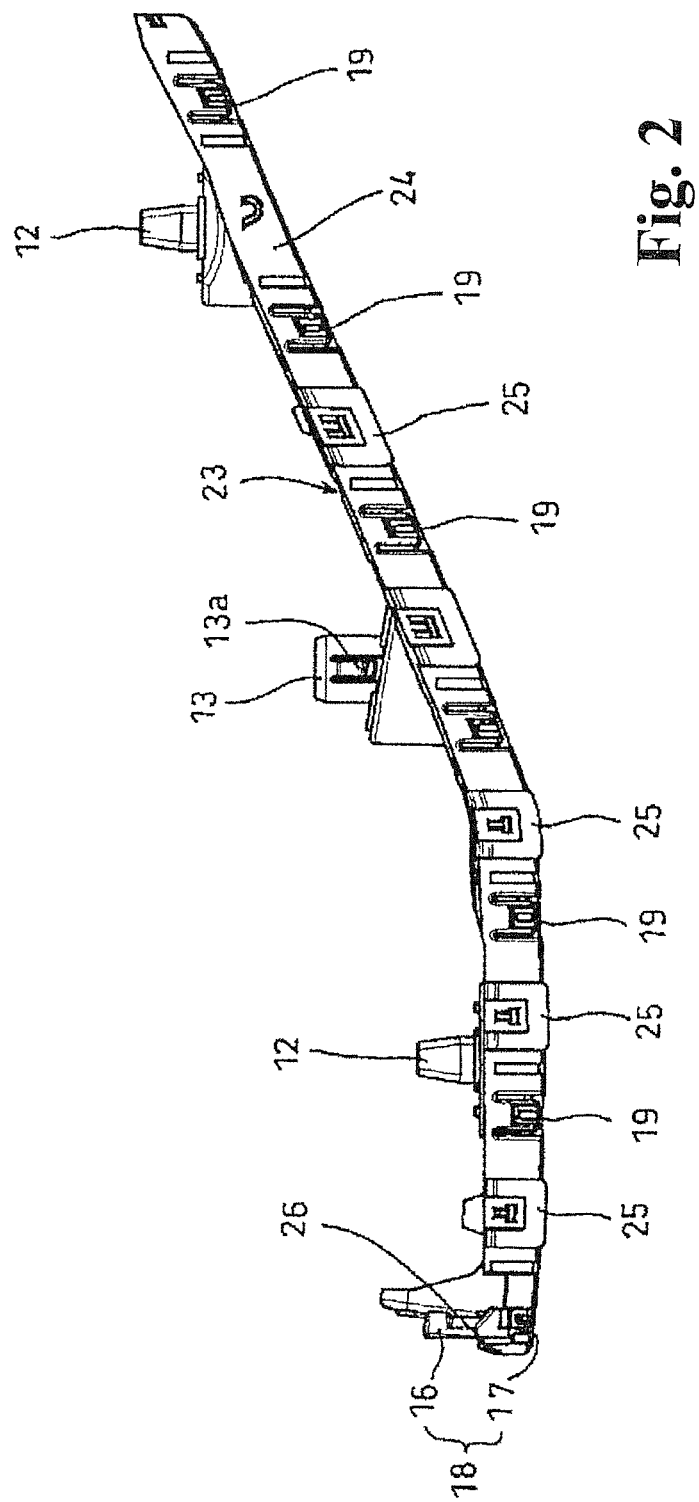
FIG. 2 is a plan view of the same bumper fixing clip.
Figure 3:
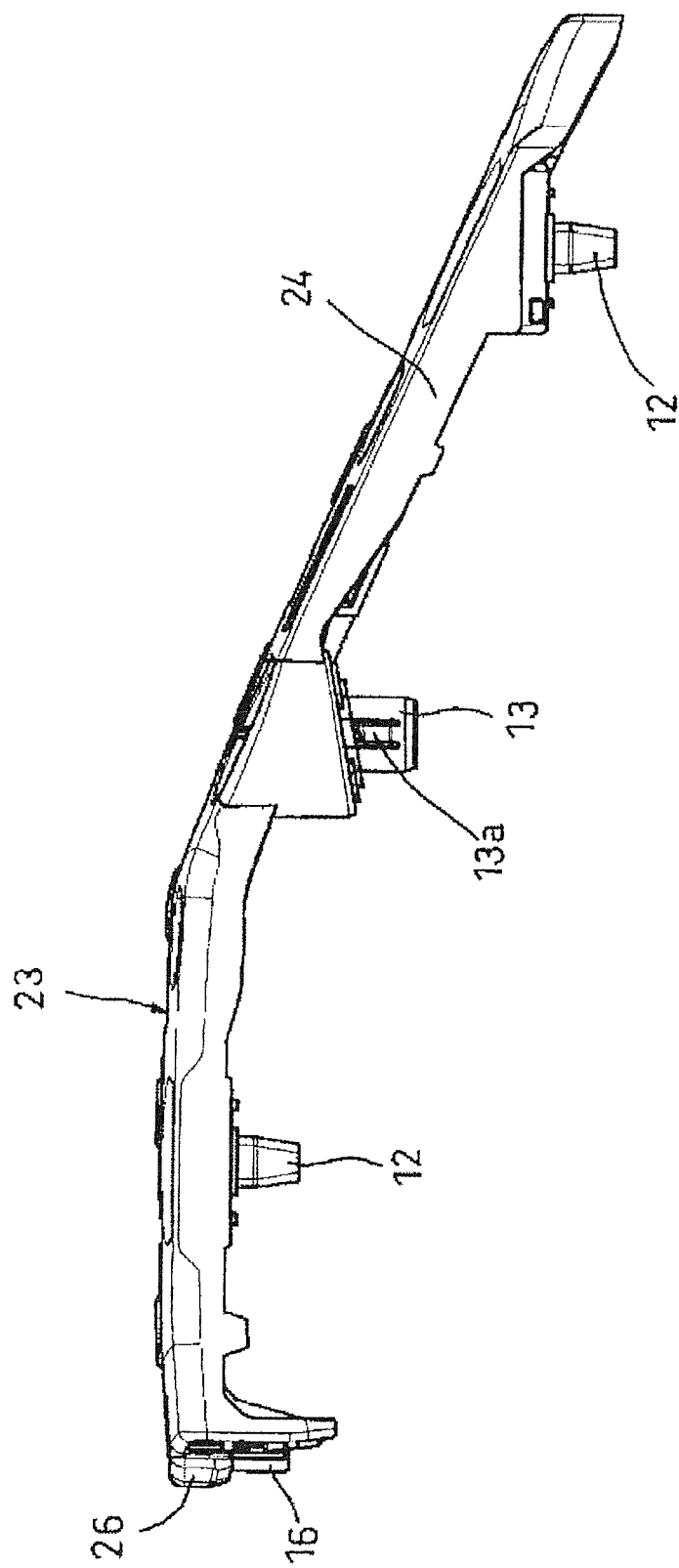
FIG. 3 is a bottom view of the same bumper fixing clip.

Hereinafter, the present invention will be explained in detail based on the drawings showing one embodiment. FIG. 1 is a perspective view of a bumper fixing clip which is one embodiment of the present invention; FIG. 2 is a plan view of the bumper fixing clip of the present invention; and FIG. 3 is a bottom view of the bumper fixing clip of the present invention. There, a bumper fixing clip 10 of the present invention comprises leg portions formed by screw grommets 12 engaging with a vehicle body panel 11 and a box anchor 13; engagement claws 19 engaging with a plurality of engagement holes 14 formed on a bumper 15 side; and an engagement member including a second engagement claw 17 engageable with or retractable from one of the engagement holes 14 formed on the bumper side by operating an operation portion 16, and the bumper fixing clip 10 fixes the bumper 15 to the vehicle body panel 11. The engagement member 18 is integrally formed with a fixing clip main body, and includes an approximately rod-like operation portion 16 whose one end is turnably supported; the second engagement claw 17 formed in a vicinity of a support end of the operation portion 16; and an abutment piece 20 formed on a side opposite to the second engagement claw 17. Also, the fixing clip main body includes a control portion 21 abutting against the abutment piece 20 of the operation portion 16, and controlling a moving range of the operation portion 16.

The bumper fixing clip 10 is formed by synthetic resins and the like, and as shown in FIG. 1 to FIG. 3, is formed in a horizontally long shape. Also, the bumper fixing clip 10 forms a fixing clip main body 23 curved along shapes of the vehicle body panel 11 and the bumper 15. The fixing clip main body 23 is formed by wall portions 24 and 24 forming an outer periphery, a plurality of lattice members 25 extending in a longitudinal direction and a width direction, and connecting the wall portions 24, and the like.

Also, the bumper fixing clip 10 includes the screw grommets 12 which are the leg portions engaging with the vehicle body panel 11 and including a split groove 12a at a center; the box anchor 13 which is the leg portion having approximately a cylindrical shape and including an engagement piece 13a projectable outward; and the engagement claws 19 engaging with the plurality of engagement holes 14 formed on the bumper 15 side. Also, between the respective engagement claws 19, there are formed guide members 25 guiding a flange 22 of the bumper 15 into a predetermined position of the bumper fixing clip 10.

Figure 8A:
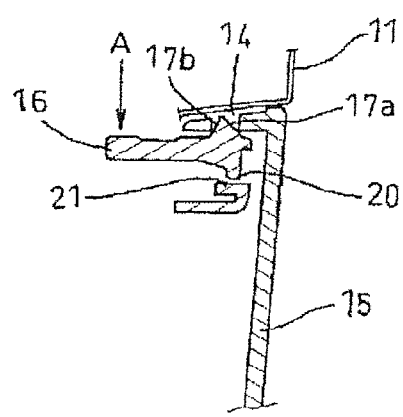
FIGS. 8(a), 8(b), and 8(c) are explanatory drawings explaining a movement of an engagement member in the same bumper fixing clip.
Figure 8B:
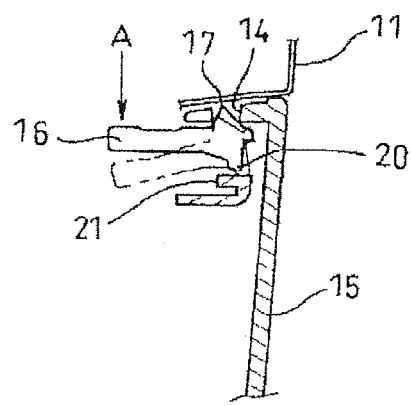

On one side end of the bumper fixing clip 10, there are provided the engagement member 18 including the second engagement claw 17 engageable with or retractable from one of the engagement holes 14 formed on the bumper side by operating the operation portion 16; and a wall portion 26 at the foremost end portion adjacent to the engagement member 18. Also, as shown in FIG. 8(b), the control portion 21 is provided at a position of abutting against the abutment piece 20 when the second engagement claw 17 is disengaged from the engagement hole 14 of the bumper 15 by carrying out a turning operation (an arrow A direction) of a lever-like operation portion 16 around the support end. Namely, the control portion 21 is arranged in the fixing clip main body 23 in a turning plane of the operation portion 16.

The engagement member 18 includes the second engagement claw 17 formed on a face facing the engagement hole 14 of the bumper 15; and the abutment piece 20 formed to project on a side opposite to the second engagement claw 17. Also, the second engagement claw 17 is a projection formed by a first inclined face 17a formed on a face facing the bumper 15 to be inserted; and a second inclined face 17b having an inclination angle larger than that of the first inclined face 17a, and facing a direction opposite to the first inclined face 17a.

Therefore, when the engagement hole 14 of the bumper 15 is inserted, the engagement member 18 is formed to be easily engaged, but to hardly come out. Also, even when an external force is applied to the bumper 15, the abutment piece 20 and the control portion 21 abut against each other so as to restrict the second engagement claw 17 abutting against a peripheral edge of the engagement hole 14 of the bumper 15 from moving in a retreating direction so as to allow the bumper 15 to be stably fixed.

The wall portion 26 is arranged adjacent to the engagement member 18, and is integrally formed at an end portion of the fixing clip main body 23. Therefore, even when the external force is applied to the bumper 15, the operation portion 16 can be controlled from deforming in a longitudinal direction of the fixing clip main body 23 or from deforming in a bumper removal direction of the operation portion 16.

Figure 4:
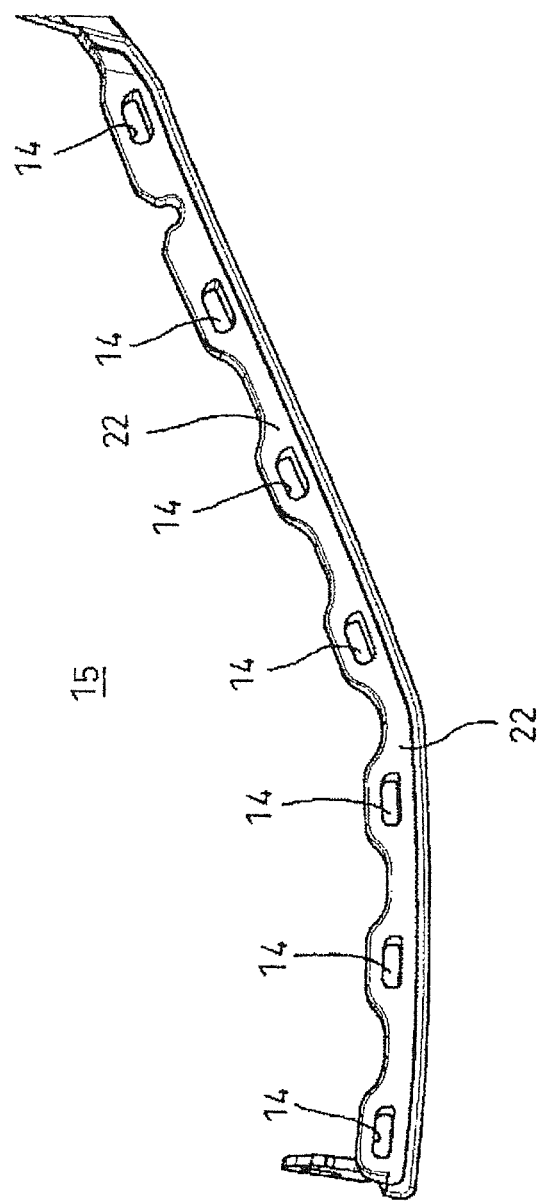
FIG. 4 is an explanatory drawing showing an arrangement of engagement holes of a bumper.

FIG. 4 is an explanatory drawing showing an arrangement of the engagement holes of the bumper. In the flange 22 extended from an upper edge portion of the bumper 15 approximately at a right angle on a vehicle body side, there are formed the engagement holes 14 engaging with the engagement claws 19 and the second engagement claw 17 formed in the bumper fixing clip 10.

Figure 5:
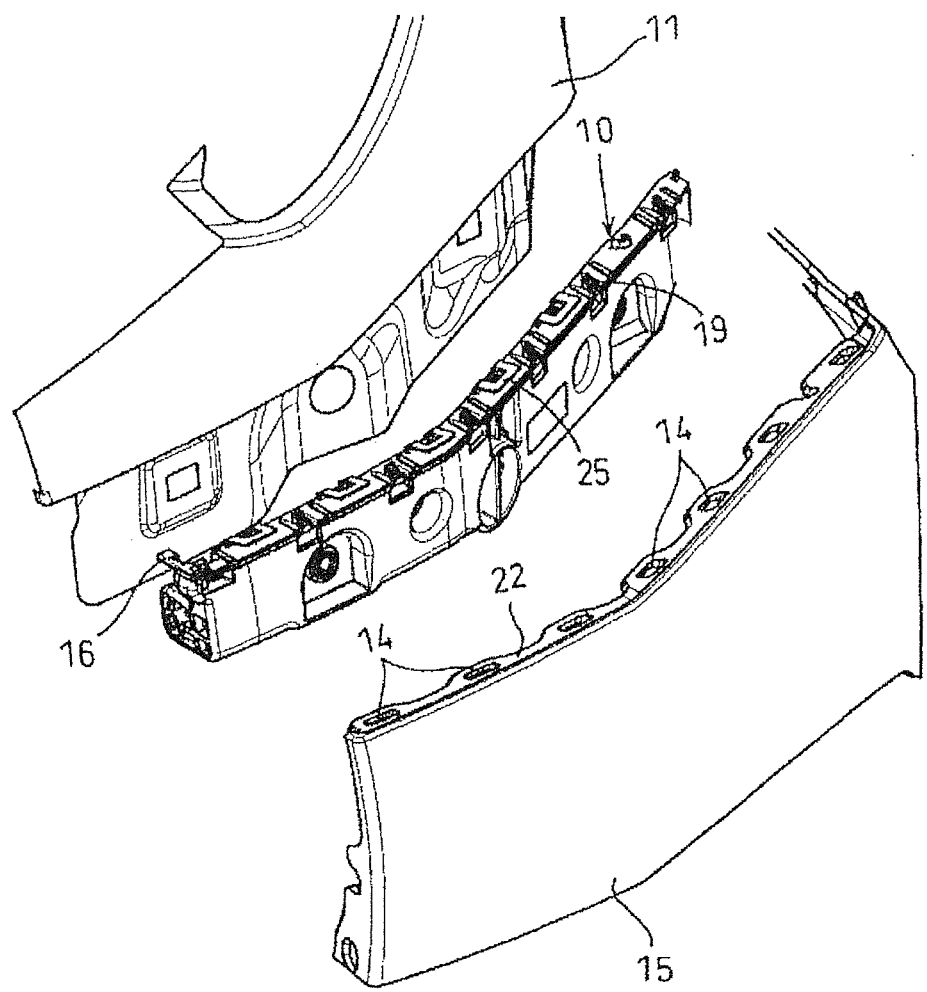
FIG. 5 is an explanatory drawing showing a relationship among a vehicle body panel, the bumper fixing clip, and the bumper.
Figure 6:
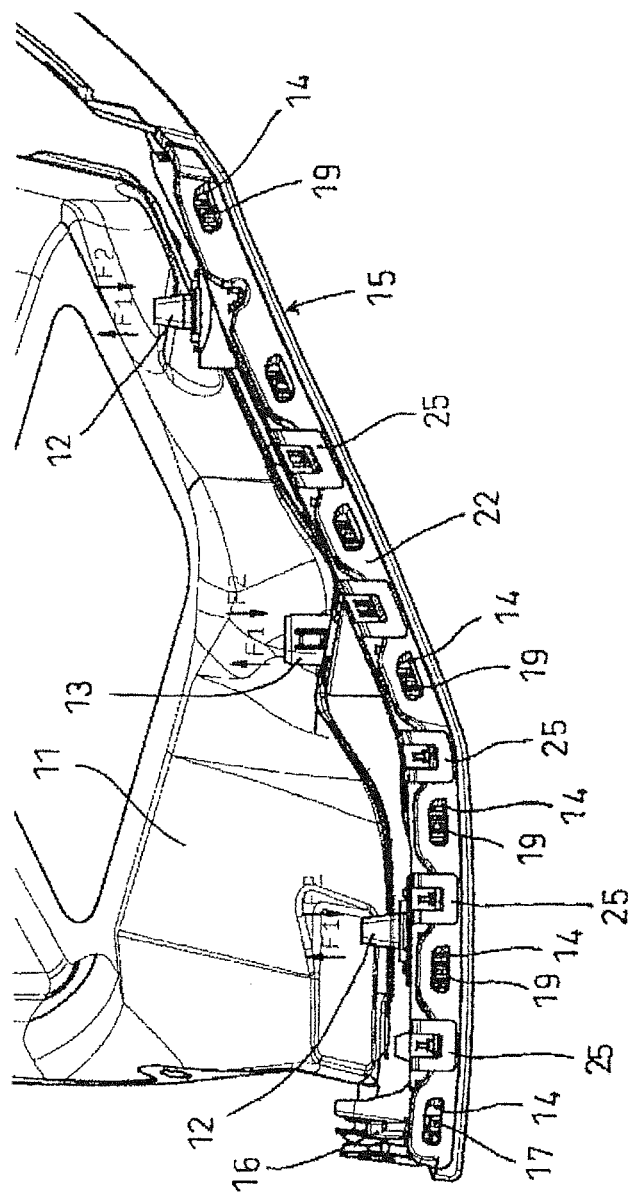
FIG. 6 is an explanatory drawing showing a state wherein the bumper is fixed to the vehicle body panel using the same bumper fixing clip.
Figure 7:
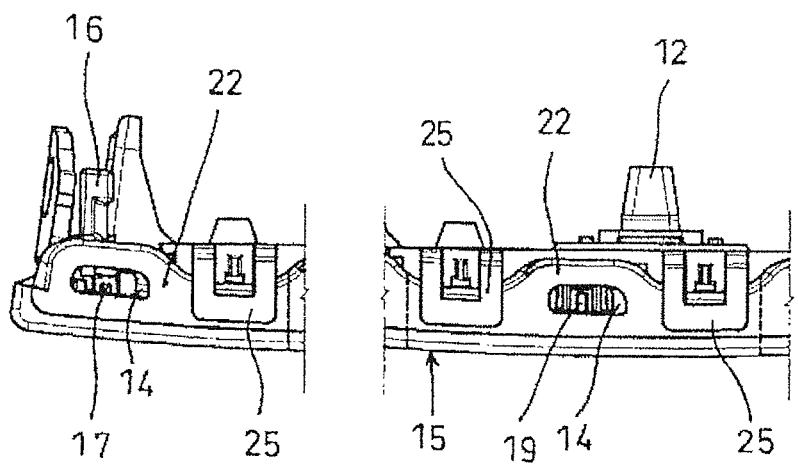
FIG. 7 is an explanatory drawing of essential parts showing a relationship between the same bumper fixing clip and the bumper.

As shown in FIGS. 5 and 6, the bumper fixing clip 10 formed as mentioned above is inserted into the vehicle body panel 11 in an arrow F1 direction so as to be fixed, and after that, the bumper fixing clip 10 is attached to the bumper 15 so as to fix the bumper 15 to the vehicle body panel 11. The bumper fixing clip 10 can be fixed to the vehicle body panel 11 by engaging the screw grommet 12 and the box anchor 13 with an attachment hole formed on a vehicle body panel 11 side. Also, in a case wherein the bumper fixing clip 10 is removed, after the engagement piece 13a of the box anchor 13 and the like are loosened, the bumper fixing clip 10 can be removed by pulling the bumper fixing clip 10 in an arrow F2 direction.

Figure 8C:
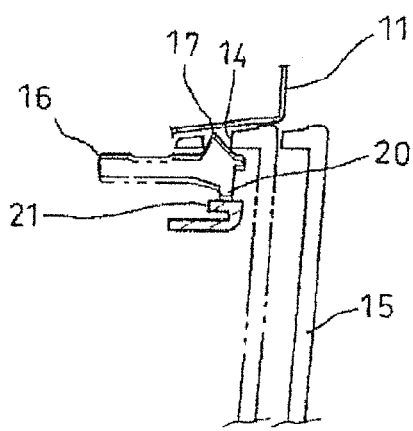

As for an engagement and attachment of the bumper fixing clip 10 and the bumper 15, positions of the engagement holes 14 formed in the flange 22 of the bumper 15 are aligned between the guide members 25 and the engagement claws 19 so as to be inserted. Then, the engagement claws 19 and the second engagement claw 17 are engaged with the respective engagement holes 14 so as to be fixed. As shown in FIGS. 8(a) and 8(b), an engagement between the second engagement claw 17 of the engagement member 18 and the engagement hole 14 of the flange are released by turning the operation portion 16 of the engagement member 18 in the arrow A direction. At that time, the turning of the operation portion 16 is controlled by abutting the abutment piece 20 against the control portion 21 so as to prevent a breakage caused by excessive turning of the operation portion 16. Also, in a case wherein a force in a detachment direction acts on the bumper 15, the inclination angle of the second inclined face 17b of the second engagement claw 17 is large so as to be difficult to come out. Moreover, as shown in FIG. 8(c), the abutment piece 20 and the control portion 21 contact with each other so as to restrict a movement in the retreating direction of the second engagement claw 17 abutting against the peripheral edge of the engagement hole 14, so that an engagement state between the second engagement claw 17 and the engagement hole 14 can be retained.

Moreover, the present invention is not limited to the aforementioned embodiment, and various design modifications can be carried out based on the description of the range of claims.

Incidentally, all contents of the specification, claims, drawings, and abstract of Japanese Patent Application No. 2012-035838 filed on Feb. 22, 2012 are cited in their entireties herein and are incorporated as a disclosure of the specification of the present invention.

What is claimed is:

1. A bumper fixing clip for fixing the bumper to a vehicle body panel, comprising;
    a leg portion adapted to engage with the vehicle body panel;
    engagement claws adapted to engage with a plurality of engagement holes formed on a bumper side; and
    an engagement member including a second engagement claw adapted to engage with or retractable from one of the engagement holes formed on the bumper side by operating an operation portion,
    wherein the engagement member is integrally formed with a fixing clip main body, and includes an approximately rod-like operation portion whose one end is supported; the second engagement claw formed in a vicinity of a support end of the operation portion; and an abutment piece formed on a side opposite to the second engagement claw, and
    the fixing clip main body includes a control portion abutting against the abutment piece of the operation portion, and controlling a moving range of the operation portion.

2. A bumper fixing clip according to claim 1, wherein the control portion is provided at a position of abutting against the abutment piece at a point of time when the second engagement claw is disengaged from the engagement hole of the bumper by carrying out a turning operation of the operation portion around the support end.

3. A bumper fixing clip according to claim 1, wherein the engagement member includes the second engagement claw formed on a face facing an engagement hole of the bumper; and the abutment piece formed to project on a side opposite to the second engagement claw, and
    when an external force is applied to the bumper, a movement of the second engagement claw abutting against a peripheral edge of the engagement hole of the bumper is restricted by a contact between the abutment piece and the control portion.

4. A bumper fixing clip according to claim 1, wherein a wall portion is provided in a part adjacent to the engagement member of the fixing clip main body, and when an external force is applied to the bumper to be fixed, the wall portion controls the operation portion from deforming in a longitudinal direction of the fixing clip main body, or controls the operation portion from deforming in a bumper removal direction.

5. A bumper fixing clip according to claim 1, wherein the second engagement claw formed in the engagement member is a projection formed by a first inclined face formed on a face facing the bumper to be inserted; and a second inclined face having an inclination angle larger than that of the first inclined face, and facing opposite to the first inclined face.

* * * * *